United States Patent [19]

Benz, deceased

[11] Patent Number: 4,492,055
[45] Date of Patent: Jan. 8, 1985

[54] HUMANE ANIMAL TRAP

[75] Inventor: Michael Benz, deceased, late of Williams Lake, Canada, by Violet E. Benz, Executrix

[73] Assignees: Violet E. Benz, Williams Lake; Michael J. Benz, Lavington; Randy Benz, Vernon, all of Canada; a part interest to each

[21] Appl. No.: 495,387

[22] Filed: May 17, 1983

[51] Int. Cl.³ ............................................. A01M 23/26
[52] U.S. Cl. ............................................. 43/88; 43/81
[58] Field of Search ................... 43/88, 81, 77, 90, 93, 43/94, 96, 83.5, 81.5

[56] References Cited

U.S. PATENT DOCUMENTS

| | | | |
|---|---|---|---|
| 1,089,975 | 3/1914 | Shaw | 43/81 |
| 1,850,534 | 3/1932 | Clausen | 43/88 |
| 3,114,985 | 12/1963 | Killinger | 43/83.5 |
| 4,117,620 | 10/1978 | Stauffer | 43/77 |
| 4,121,370 | 10/1984 | Benz | 43/83.5 |

Primary Examiner—Gene P. Crosby
Assistant Examiner—C. McKee
Attorney, Agent, or Firm—Jones, Tullar & Cooper

[57] ABSTRACT

The invention is for an improved humane animal trap which reduces suffering to the trapped animal and reduces damage to the pelt. The trap includes a pair of circular jaws pivotally joined by strong helical springs. The trigger mechanism utilizes a lower lever member which extends into the stationary jaw and is biased against a bait holder/latch member by a flat spring. An upper lever member is engageable with the lower lever member at one end and at the other end supports the movable jaw when the trap is set. When an animal takes the bait the lever members are released from their constraints and the movable jaw moves rapidly under the bias of the main helical spring to trap the animal, just behind its head, between the trap jaws.

7 Claims, 5 Drawing Figures

4,492,055

HUMANE ANIMAL TRAP

This invention relates in general to animal traps and, in particular, to a new and improved trap especially effective in the humane trapping of small animals.

BACKGROUND OF THE INVENTION

Canadian Pat. No. 1,039,506 issued Oct. 3, 1978 to Michael Benz (U.S. Pat. No. 4,121,370) discloses a "Humane Animal Trap" and the present invention represents an improvement over the trap of that patent. The trap of the mentioned patent is effective for the trapping of small animals in that it can quickly break the back or neck of the trapped animal and thereby greatly reduce the duration of suffering for the animal. Such trap also reduces damage to the pelt of the trapped animal since there will be little or no struggling or fighting the trap by the trapped animal.

Notwithstanding the advantages of the aforementioned trap improvements thereto have been necessary to further reduce the suffering of a trapped animal and so as to meet the specifications of the Federal-Provincial Committee for Humane Trapping.

SUMMARY OF THE INVENTION

The trap of the present invention meets the specification referred to above and improves on the trap of Canadian Pat. No. 1,039,506 by utilizing jaws which will effectively catch an animal, such as a mink or a marten just behind the head, quickly breaking the animal's neck and ensuring a minimum of suffering. The spring used to bias the jaws together is heavier than was previously used and, most significantly, the trigger mechanism of the present trap is more easily set and is more effective in releasing the jaws to achieve trapping action. The trigger mechanism utilizes a pair of interacting levers, one of which is engageable with a bait hook, the other of which is engageable by a catch of the movable jaw. When the trap is set the two levers are locked together with the one lever latched by the bait hook and the other supporting the movable jaw by the catch. When the animal takes the bait the one lever is released, thereby releasing the other lever which in turn releases the catch on the movable jaw, that jaw moving quickly towards the fixed jaw to trap the animal therebetween. When the bait hook releases the one lever the above described chain of events occurs almost instantaneously and the animal has no opportunity to remove its body from the vulnerable location with its head at the bait hook. The movable jaw will strike the animal just behind the head and break its neck so quickly that there is an absolute minimum of suffering for the animal.

Broadly speaking therefore the present invention provides a humane animal trap comprising: (a) a pair of generally circular jaws, each jaw having arm means extending outwardly from the outer surface thereof; (b) main spring means connected to the arm means so as to bias the jaws to a closed position, the jaws being openable against the bias of the spring means; (c) lower trigger means pivotally connected to lug means outside one of the jaws and extending into the interior of the one jaw; (d) support means extending generally perpendicularly from the lug means away from the one jaw; (e) upper trigger means pivotally connected at one end adjacent the free end of the support means and engageable at the other end with a notch in the lower trigger means; (f) catch means on the other jaw engageable with a second notch adjacent the one end of the upper trigger means; and (g) latch means on the one jaw adjacent the free end of the lower trigger means and engageable therewith.

DESCRIPTION OF THE PREFERRED EMBODIMENT

Figure 1:
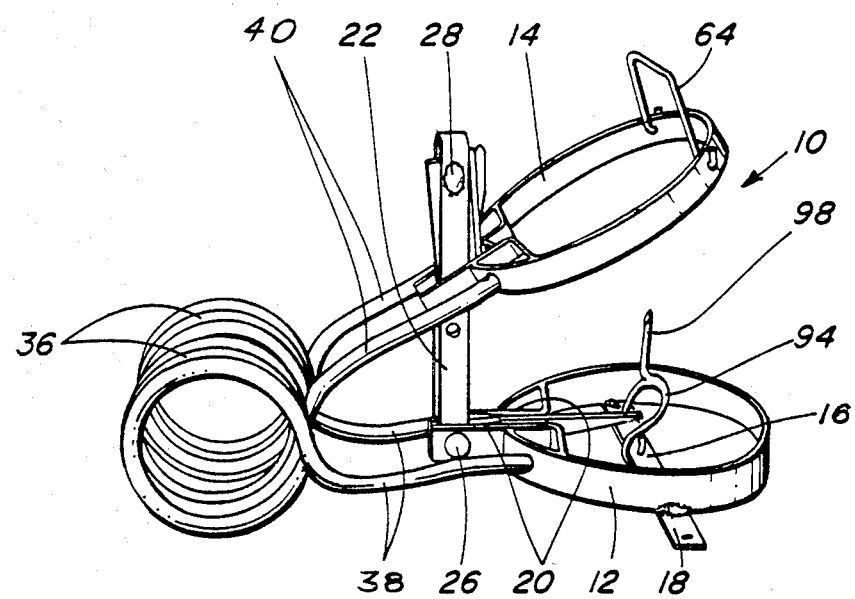
FIG. 1 shows the trap of the present invention in side perspective, in an open condition.
Figure 2:
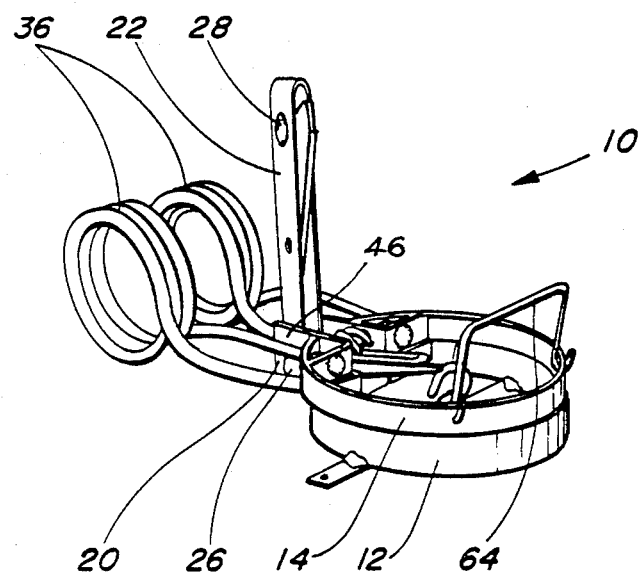
FIG. 2 shows the trap of FIG. 1 in a closed condition.

FIG. 1 shows the trap 10 of the present invention in an open or set condition while FIG. 2 shows the trap in a closed or actuated condition. As seen in these figures the trap 10 includes a pair of generally circular jaws 12, 14, jaw 12 being provided with a cross brace 16 welded to the underside thereof and extending diametrically of the jaw 12. The brace 16 has extensions 18 at each end projecting beyond the side wall of the jaw 12, the function of which will become apparent hereinafter.

Extending rearwardly of the jaw 12, normal to the cross brace 16 is a pair of parallel spaced apart lugs 20. A generally inverted U-shaped support member 22 is welded at its bottom ends 24 to the lugs 20, the support member extending away from jaw 12 normal to the plane thereof. The lugs 20 and the bottom ends of the support 22 have holes extending therethrough for receipt of a pivot pin 26. At the upper or free end of the support a pivot pin 28 extends through the support parallel to, and generally in vertical alignment with, the pivot pin 26.

Figure 4:
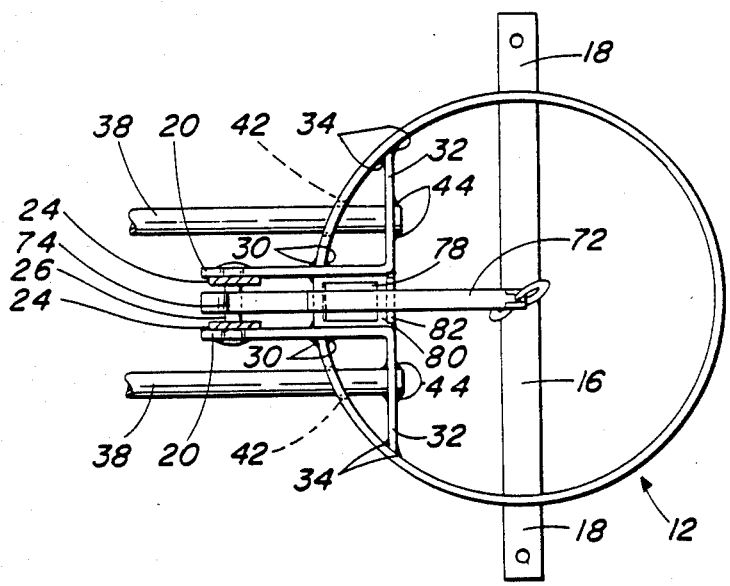
FIGS. 4 and 5 show plan views of the lower and upper jaws respectively.

Each lug 20 has a general L-shape and is welded to the jaw 12 as shown in FIG. 4. Thus the long leg of each lug 20 is welded to an end face of the jaw 12 as at 30 so that the short leg 32 is situated within the interior of the jaw and is welded to the inside surface as at 34.

As seen in FIGS. 1 and 2 the trap of the present invention utilizes a pair of strong helical or coil main springs 36. The springs 36 are identical to each other, are closely spaced apart at the rear of the trap and define through the centers thereof a pivot axis for the trap jaws. Each spring 36 has a pair of ends 38, 40 which project outwardly therefrom and, in the illustrated embodiment, these ends serve as support arms for the jaws 12, 14. With reference to FIGS. 1 and 4, for example, it is seen that the arms 38 from the two springs 36 lead through appropriately sized holes 42 in the jaw 12 and are suitably welded to the short legs 32 of the L-shaped lugs 20, as at 44.

Jaw 14 is similarly configured to jaw 12 in that it is generally circular in plan and is provided with a pair of L-shaped lugs 46 welded to the jaw 14, each lug 46 being in essentially the same vertical plane as a corresponding lug 20 of the jaw 12. Thus the long leg of each lug 46 is welded to an end face of the jaw 14 as at 48 and the short leg 50 is situated within the interior of the jaw 14 and is welded to the inside jaw surface as at 52.

Figure 5:
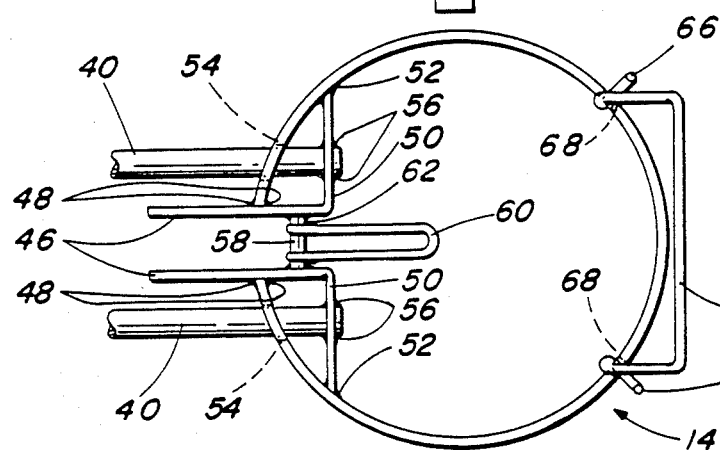

As seen in FIGS. 1 and 5, the legs 40 of the main springs 36 lead through appropriately sized openings or holes 54 in the jaw 14 and are suitably welded to the short legs 50 of the L-shaped lugs 46 as at 56.

Extending across the gap between the long legs of the lugs 46 is a pin 58, welded at each end to one of the lugs 46. A U-shaped catch member 60, formed from heavy steel wire has its free ends wrapped about the pin 58 as at 62 so that the catch member 60 is free to pivot or rotate about the pin 58.

At the opposite end of the jaw 14, that is adjacent the front thereof, a wide inverted U-shaped handle member 64 is provided, the free ends 66 of the handle member being bent so as to project through suitable holes 68 in the jaw 14. When the jaw 14 is closed, adjacent the jaw 12, the handle member 64 will project upwardly from the jaw 14 for easy grasping by the user of the trap.

Figure 3:
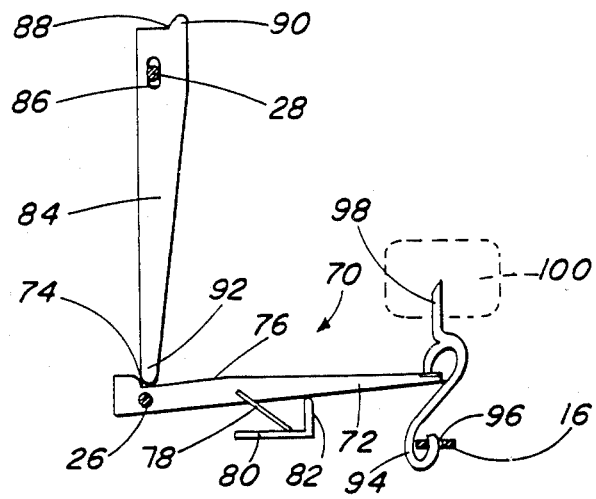
FIG. 3 shows the elements of the trigger mechanism, absent the rest of the trap structure.

The remaining structural feature to be described is the trigger mechanism 70 and reference will be made to all figures although primary reference will be made to FIG. 3.

The trigger mechanism includes a lower lever member 72 which is pivotally connected at one end between the lugs 20 of the jaw 12 with the other end thereof projecting from between the lugs into the interior of the jaw 12 to adjacent the cross-brace 16. The upper edge of the lever member 72 is provided with a notch 74 defined by a downwardly sloping portion 76 of the upper edge. The lower edge of the lever member 72 is provided, in an upwardly and rearwardly inclined slot therein, with a flat, transversely extending spring member 78. Spring member 78 is sized to bear, when the trap is set, against an L-shaped plate 80 which is welded between the lugs 20 as seen in FIG. 1. The upper edge of the short leg 82 of the plate 80 provides a lower limit for the lever member 72 so that the spring 78 will not be overstressed when the trap is set.

An upper lever member 84 has adjacent the upper end thereof a vertically extending slot 86 which receives the upper pivot pin 28 of the support member 22 so that the lever member when positioned between the legs 24 of the support 22 can have both vertical and pivotal movements. The upper end of the lever member 84 has a notch 88 defined by a forward upstanding projection 90. The forward edge of the lever member tapers rearwardly to the other end 92 which is adapted for interengagement with the notch 74 of the lower lever member 72.

Pivotally attached to the cross-brace 16 within the jaw 12 is an S-shaped latch member 94. As seen in FIG. 3 one end of the latch member extends through an opening 96 in the cross-brace 16 and is crimped so that the latch member 94 cannot fall unintentionally from the cross-brace 16. The other end of the latch member 94 is adapted for engagement with the upper edge of the other end of the lever member 72. Also, the latch member has a pointed upstanding projection 98, which projection serves as a handle for the latch member and, when the trap is set, serves as a bait-receiving member.

The operation of the trap of the invention will be described hereinbelow, first with regard to setting thereof and then with regard to actuation thereof.

Assuming the trap to be in the closed position of FIG. 1 the trapper first of all engages the latch member 94 with the upper edge of the lower lever member 72. In order to do this the lower lever member must be pushed downwardly against the bias of the spring 78 so that when the latch member 94 is in engagement with the lever member 72 the spring bias will keep these members in engagement.

The trapper then engages the lower end 92 of the upper lever member 84 in the notch 74 of the lower lever member 72. He then places his feet on the extensions 18 of the cross-brace 16, grasps the handle 64 and lifts the jaw 14 upwardly against the closing bias of the main springs 36. At the appropriate height the trapper swings the U-shaped catch 60 upwardly so that it can engage the notch 88 of the upper lever member 84. The upper jaw is slowly released so as to avoid any unwanted movement of the various trigger members and the trap is then set. In the set condition the catch 60 is engaged with the notch 88, the jaw 14 being biased towards the jaw 12 and placing a clockwise moment (as in FIG. 3) on the upper lever member 84 which is resisted by the engagement between the lower end 92 of the upper lever member and the notch 74 and by the engagement between the latch member 94 and the lower lever member 72.

When an animal enters the trap and grasps the bait 100 with enough force to release the latch member 94 from the lower lever member 72 the latter will rapidly rotate counterclockwise about the pivot pin 26 under the influence of the aforementioned moment and the bias of the flat spring 78. Such counterclockwise movement releases the engagement between the upper and lower lever members at the notch 74 and the released upper lever member 84 will rotate clockwise and slide on the pivot pin 28 rapidly so as to release the catch 60 from the notch 88. This frees the upper jaw 14 and it swings rapidly, under the bias of the main spring 36, towards the other jaw 12, the chain of events being so rapid that the animal has no opportunity to move from between the jaws of the trap. The closure forces generated by the main springs 36 are so great that the jaws 12, 14 will instantaneously break the neck of the animal, resulting in little or no suffering for the animal and little or no damage to the pelt.

The foregoing has described the best mode for putting the invention into effect but it is understood that others skilled in the art could evolve variations therein without departing from the spirit of the invention. Thus the scope of protection to be afforded the invention is to be determined from the claims appended hereto.

The embodiments of the invention in which an exclusive property or privilege is claimed are defined as follows:

1. A humane animal trap comprising:
   (a) a pair of generally circular jaws, each jaw having arm means extending outwardly from the outer surface thereof;
   (b) main spring means connected to said arm means so as to bias said jaws to a closed position, said jaws being openable against the bias of said spring means;
   (c) lower trigger means pivotally connected to lug means outside one of said jaws and extending into the interior of said one jaw;
   (d) support means extending generally perpendicularly from said lug means away from said one jaw;
   (e) upper trigger means pivotally connected at one end adjacent the free end of said support means and engageable at the other end with a notch in said lower trigger means;
   (f) catch means on said other jaw engageable with a second notch adjacent the one end of said upper trigger means; and
   (g) latch means on said one jaw adjacent the free end of said lower trigger means and engageable therewith.

2. The trap of claim 1 wherein said latch means is provided with bait holding means and is pivotally connected to a cross-brace extending diametrically of said one jaw.

3. The trap of claim 1 and including flat spring means provided in said lower trigger means to bias said lower trigger member against said latch means when said latch means is engaged with said lower trigger means.

4. The trap of claim 1 wherein said main spring means includes a pair of adjacent helical springs and said arm means are extensions of the ends of said helical springs.

5. The trap of claim 1 wherein said catch means is an inverted U-shaped member pivotally connected at the free ends thereof to said other jaw.

6. The trap of claim 1 and including handle means on said other jaw for moving said other jaw away from said one jaw against the bias of said main spring means.

7. The trap of claim 1 wherein said lug means includes a pair of L-shaped lugs fixed to said one jaw, with the longer legs thereof being parallel and the shorter legs thereof being located within said one jaw and extending away from each other to be fixed to the inside wall of said one jaw.

* * * * *